United States Patent
Nishitani

(10) Patent No.: US 12,130,698 B2
(45) Date of Patent: Oct. 29, 2024

(54) INFORMATION PROCESSING SYSTEM FOR ABNORMAL EVENT DETERMINATION FROM TIME-SERIES DATA, AND METHODS AND PROGRAMS FOR OPERATING THE SAME

(71) Applicant: TOYOTA JIDOSHA KABUSHIKI KAISHA, Toyota (JP)

(72) Inventor: Ippei Nishitani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 63 days.

(21) Appl. No.: 18/098,232

(22) Filed: Jan. 18, 2023

(65) Prior Publication Data

US 2023/0236921 A1 Jul. 27, 2023

(30) Foreign Application Priority Data

Jan. 27, 2022 (JP) ................................. 2022-011028

(51) Int. Cl.
*G06F 11/00* (2006.01)
*G06F 11/07* (2006.01)

(52) U.S. Cl.
CPC ........ *G06F 11/079* (2013.01); *G06F 11/0721* (2013.01)

(58) Field of Classification Search
CPC ............... G06F 11/079; G06F 11/0721; G06F 11/3452; G06F 11/3457
See application file for complete search history.

(56) References Cited

U.S. PATENT DOCUMENTS

| | | | | |
|---|---|---|---|---|
| 10,880,690 B2 * | 12/2020 | Scanlon | ................... | H04W 4/80 |
| 2011/0046839 A1 * | 2/2011 | Sato | ......................... | G07C 5/04 |
| | | | | 701/31.4 |
| 2017/0242076 A1 * | 8/2017 | Yoshiura | ............ | G05B 23/0235 |
| 2018/0059249 A1 * | 3/2018 | Teshima | ................ | G06Q 10/101 |
| 2018/0164794 A1 * | 6/2018 | Nikovski | ................ | G06N 5/022 |

(Continued)

FOREIGN PATENT DOCUMENTS

WO 2020/245968 A1 12/2020

OTHER PUBLICATIONS

Mert Ergurtuna et al., "An Efficient Formula Synthesis Method with Past Signal Temporal Logic", IFAC—PapersOnLine vol. 52, Issue 11, 2019, pp. 43-48, Apr. 16, 2019.

(Continued)

*Primary Examiner* — Elmira Mehrmanesh
(74) *Attorney, Agent, or Firm* — Dinsmore & Shohl LLP

(57) ABSTRACT

An information processing system, an information processing method, and a program that can examine an abnormal event based on abnormal time-series data including a plurality of signal data pieces are provided. An information processing device includes an acquisition unit configured to acquire a plurality of time-series data pieces, each time-series data piece including a plurality of signal data pieces, and the plurality of time-series data pieces including a plurality of normal time-series data pieces and abnormal time-series data, and an examination unit configured to determine for each signal data piece whether the abnormal time-series data is similar to each normal time-series data piece in each time section and examine an abnormal event based on a result of the determination.

7 Claims, 12 Drawing Sheets

(56) References Cited

U.S. PATENT DOCUMENTS

| | | | | |
|---|---|---|---|---|
| 2018/0348269 A1* | 12/2018 | Ojima | .................... | G06F 18/217 |
| 2019/0145860 A1* | 5/2019 | Phillips | ................ | G05D 1/0088 |
| | | | | 701/33.9 |
| 2019/0196893 A1* | 6/2019 | Lee | ..................... | G06F 11/0778 |
| 2020/0257686 A1* | 8/2020 | Law | ......................... | G06F 18/22 |
| 2020/0409816 A1* | 12/2020 | Gladisch | ............. | G06F 11/3452 |
| 2021/0197848 A1* | 7/2021 | Kilaru | ....................... | G06N 7/01 |
| 2021/0216386 A1* | 7/2021 | Masuzaki | ............ | G05B 23/024 |
| 2023/0213927 A1* | 7/2023 | Oka | .................... | G05B 23/0275 |
| | | | | 700/108 |
| 2023/0252038 A1* | 8/2023 | Konashi | .................. | G06F 18/22 |

OTHER PUBLICATIONS

Ezio Bartocci et al., "Automatic Failure Explanation in CPS Models", 17th International Conference, Software Engineering and Formal Methods (SEFM) 2019, Sep. 9, 2019.

* cited by examiner

FAILURE TARGET POINT

SUCCESS DATA GROUP

INFORMATION PROCESSING SYSTEM FOR ABNORMAL EVENT DETERMINATION FROM TIME-SERIES DATA, AND METHODS AND PROGRAMS FOR OPERATING THE SAME

CROSS REFERENCE TO RELATED APPLICATIONS

This application is based upon and claims the benefit of priority from Japanese patent application No. 2022-011028, filed on Jan. 27, 2022, the disclosure of which is incorporated herein in its entirety by reference.

BACKGROUND

The present disclosure relates to an information processing system, method, and program, and in particular to a technique for examining an abnormal event.

International Patent Publication No. WO2020/245968 discloses an information processing system that detects abnormal events from target time-series data.

SUMMARY

An information processing system capable of examining an abnormal event (e.g., detecting an abnormal event and specifying a cause of an abnormality) from abnormal time-series data including a plurality of signal data pieces (e.g., position data of a plurality of objects) is desired.

The present disclosure has been made to solve such a problem and an object thereof is to provide an information processing system, an information processing method, and a program that can examine an abnormal event based on abnormal time-series data including a plurality of signal data pieces.

In an example aspect of an embodiment, an information processing system includes:
an acquisition unit configured to acquire a plurality of time-series data pieces, each time-series data piece including a plurality of signal data pieces, and the plurality of time-series data pieces including abnormal time-series data and a plurality of normal time-series data pieces; and
an examination unit configured to determine for each signal data piece whether the abnormal time-series data is similar to each normal time-series data piece in each time section and examine an abnormal event based on a result of the determination.

In another example aspect of an embodiment, an information processing method performed by a computer includes:
acquiring a plurality of time-series data pieces, each time-series data piece including a plurality of signal data pieces, and the plurality of time-series data pieces including abnormal time-series data and a plurality of normal time-series data pieces; and
determining for each signal data piece whether the abnormal time-series data is similar to each normal time-series data piece in each time section and examining an abnormal event based on a result of the determination.

In another example aspect of an embodiment, a program causes a computer to execute:
acquiring a plurality of time-series data pieces, each time-series data piece including a plurality of signal data pieces, and the plurality of time-series data pieces including abnormal time-series data and a plurality of normal time-series data pieces; and
determining for each signal data piece whether the abnormal time-series data is similar to each normal time-series data piece in each time section and examining an abnormal event based on a result of the determination.

According to the present disclosure, it is possible to provide an information processing system, an information processing method, and a program that can examine an abnormal event based on abnormal time-series data including a plurality of signal data pieces.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, the present disclosure will be described through the embodiments of the disclosure, but the disclosure set forth in the claims is not limited to the following embodiments. Further, not all of the configurations described in the embodiment are necessary to solve the problem.

First Embodiment

Figure 1:
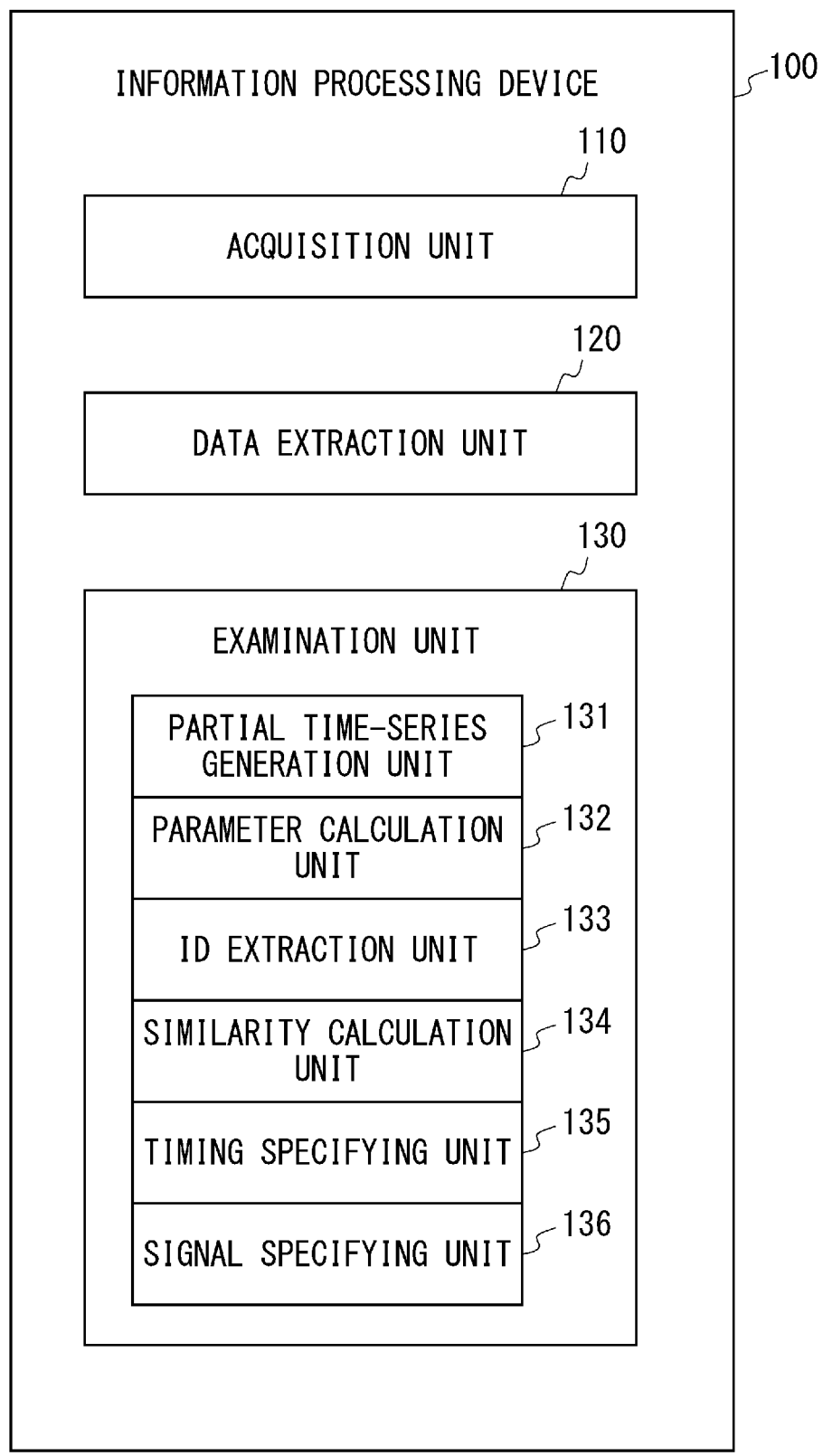
FIG. 1 is a block diagram showing a configuration of an information processing device according to a first embodiment.

Hereinafter, an information processing device according to a first embodiment will be described with reference to the drawings. FIG. 1 is a block diagram showing a configuration of an information processing device 100 according to a first embodiment. The information processing device 100 is an example of an information processing system. The information processing device 100 may be an edge terminal. A system in which processing is completed within an edge terminal can also be included in an information processing system. As will be discussed lastly, the information processing system may include a server.

The information processing device 100 includes an acquisition unit 110, a data extraction unit 120, and an examination unit 130. The information processing device 100 further includes a processor and a memory (not shown). When the processor executes a program, the information processing device 100 functions as the acquisition unit 110, the data extraction unit 120, and the examination unit 130.

The acquisition unit 110 acquires a plurality of time-series data pieces. Each piece of the time-series data includes a plurality of signal data pieces. The plurality of time-series data pieces include abnormal time-series data and a plurality of normal time-series data pieces. The abnormal time-series data may also be referred to as failure target data or defect data. The abnormal time-series data may be data that violates system requirements. The normal time-series data may also referred to success data. Hereinafter, a case in which each piece of the time-series data is simulation data will be mainly described, but each piece of the time-series data may be real world experimental data.

The acquisition unit 110 may conduct a search-based test for the purpose of searching for data (defect data) that violates the system requirements and then extract necessary information from the test result. This enables a user to efficiently analyze the defect data. The acquisition unit 110 may receive information as a result of the search-based test regarding whether or not each simulation data piece satisfies the system requirements. The search-based test enables an efficient search for violation of the system requirements by optimization.

The acquisition unit 110 may conduct tests other than the search-based test. The acquisition unit 110 may, for example, conduct a test in which simulation conditions are set at equal intervals (e.g., grid test) or a test in which the user sets the simulation conditions optionally.

Specifically, the acquisition unit 110 simulates a movement of a plurality of objects (e.g., robot R1, robot R2, and robot R3) whose relative positions change with respect to each other according to time. In such a case, a departure point and time of each object may be set as the simulation conditions.

Hereinafter, a case in which movements of a plurality of objects are simulated will be mainly described. However, the time-series data may be used to examine whether an operation of a control system meets the system requirements under various conditions. The controls of interest may be, for example, engine control, merging control of automatic driving vehicles, or smart grid control.

In the case of engine control, an amount of divergence between a target vehicle speed and an actual vehicle speed can be examined by using a plurality of signal data pieces (e.g., an input trajectory of an accelerator and a brake) under the input conditions to the accelerator and the brake. In the case of merging control of automatic driving vehicles, collisions of the automatic driving vehicles for various initial positions can be examined by using a plurality of signal data pieces (e.g., movement trajectories of the automatic driving vehicles). In the case of smart grid control, excess or deficiency of electricity in each facility under various supply and demand conditions can be examined by using a plurality of signal data pieces (e.g., an amount of electricity used and generated).

The acquisition unit 110 can acquire a plurality of time-series data pieces by extracting necessary information from a result of a search-based test or the like. As mentioned above, each piece of the time-series data includes a plurality of signal data pieces. The acquisition unit 110 may use, for example, from the results of the passing simulation of the robots R1, R2 and R3, (x, y) data of the robot R1 as first signal data, (x, y) data of the robot R2 as second signal data and (x, y) data of the robot R3 as third signal data.

Note that the acquisition unit 110 can set any data related to an unexpected behavior as the signal data. For example, in a robot control simulation, (x, y) data of a robot may be used as the first signal data and position data of an obstacle may be used as the second signal data. In such a case, an unexpected behavior of a robot movement in a specific obstacle arrangement can be detected. In the case of engine control simulation, an accelerator input trajectory may be used as the first signal data, a brake input trajectory may be used as the second signal data, an outside air temperature may be used as the third signal data, and a shift may be used as fourth signal data.

The data extraction unit 120 extracts the abnormal time-series data and the normal time-series data from the plurality of time-series data pieces. For example, time-series data related to movements of a plurality of objects may include abnormal time-series data due to an interaction among the plurality of objects. Specifically, when an object passes another object, it may collide with it, stop, or take an unnecessary detour. Such an event is called an abnormal event, or unexpected behavior.

For example, time-series data in which a predetermined object reaches a destination point by an intended time (e.g., 120 seconds after a start of a simulation) is classified as the normal time-series data. All other time-series data pieces are classified as the abnormal time-series data.

More specifically, the data extraction unit 120 defines the simulation data violating the system requirements as the abnormal time-series data. The system requirements may be optionally determined by the user. The system requirements may be, for example, that a predetermined mobile body reaches its destination point within a predetermined time. Information about whether the system requirements are violated may be included in a result of a search-based test. The defect data may be determined based on a threshold or depending on whether a condition expressed in the form of STL (Signal Temporal Logic) is met.

Note that the data extraction unit 120 may extract the defect data based on a request of a subsystem instead of a request of an entire system. For example, a system requirement that a plurality of objects (e.g., autonomous mobile bodies) reach their destination points in time may include a subsystem requirement that an error of position estimation for each object be less than or equal to a threshold. In such a case, the data extraction unit 120 can define, as the normal time-series data, simulation data in which an error of position estimation for each object is less than or equal to the threshold, and other simulation data as the abnormal time-series data.

The examination unit 130 determines, for each piece of the signal data, whether the abnormal time-series data in each time section is similar to each piece of the normal time-series data. The examination unit 130 may determine, for example, whether a success point described later is within a predetermined range of a failure target point described later.

The examination unit 130 examines an abnormal event based on a result of the determination. The examination of an abnormal event includes at least one of detection of a timing when the abnormal event has occurred (the timing is hereafter referred to as a task timing), and specification of a cause of an abnormality. Specifying the cause of the abnormality means specifying signal data related to the cause of the occurrence of the abnormal event from among a plurality of signal data pieces included in the abnormal time-series data. The examination unit 130 may specify a single signal or a signal combination.

The examination unit 130 includes a partial time-series generation unit 131, a parameter calculation unit 132, an ID extraction unit 133, a similarity calculation unit 134, a timing specifying unit 135, and a signal specifying unit 136.

The partial time-series generation unit 131 first processes each signal data piece in a partially time-series manner. The partial time-series generation unit 131 slides, for example, a 10 second time window each second to generate the partial time-series data. In such cases, the time section is expressed, for example, as [0-10, 1-11, . . . , 110-120 (sec)]. Window widths are not limited to 10 seconds, and sliding steps are not limited to one second. For example, if all time windows start at 0 seconds, the time section is expressed as [0-1, 0-2, . . . , 0-120 (sec)].

Hereinafter, the signal data generated by a partial time-series manner is sometimes referred to as partial time-series signal data. The signal data generated by a partial time-series manner from a signal data included in the abnormal time-series data is sometimes referred to as first partial time-series signal data. The signal data generated by a partial time-series manner from a signal data included in the normal time-series data is sometimes referred to as second partial time-series signal data. The partial time-series data is also referred to as time-series data in each time section.

For each signal data piece, the parameter calculation unit 132 calculates a feature parameter of each time-series data piece in each time section. That is, the parameter calculation unit 132 calculates the feature parameter of each partial time-series signal data piece. The feature parameter is also referred to as a feature point. The feature parameter of the first partial time-series signal data is referred to as a failure target point, and the feature parameter of the second partial time-series signal data is referred to as a success point.

The parameter calculation unit 132 may, for example, extract position coordinates (e.g., x coordinate of the robot R1, y coordinate of the robot R1) of the robot R1 at each of a plurality of time points (e.g., 20 seconds, 21 seconds, 22 seconds, 23 seconds, 24 seconds, 25 seconds, 26 seconds, 27 seconds, 28 seconds, 29 seconds, and 30 seconds after a start of the simulation) and calculates feature data by arranging (coupling) the extracted position coordinates.

The method for calculating the feature parameters is not limited to the method described above for extracting and coupling signal data values at a plurality of time points. The parameter calculation unit 132 may calculate the feature data by using techniques such as sparse coding, wavelet transformation, shapelet transformation, singular spectrum decomposition, and non-negative matrix factorization.

For each signal data piece, the ID extraction unit 133 extracts an ID (hereafter referred to as a similar ID) of the normal time-series data similar to that of the abnormal time-series data in each time section. For example, for each signal data piece, the ID extraction unit 133 calculates the feature parameter of each time-series data piece in each time section.

Specifically, the ID extraction unit 133 specifies the success point included in a predetermined range of the failure target point, and extracts the ID of the normal time-series data corresponding to the specified success point. That is, if the Euclidean distance between the feature parameter of the first partial time-series data and the feature parameter of the second partial time-series data is less than or equal to a threshold, the ID of the normal time-series data corresponding to the second partial time-series data is extracted as the similar ID.

The ID extraction unit 133 may extract the similar ID based on the Mahalanobis distance or cosine similarity instead of the Euclidean distance. Furthermore, the ID extraction unit 133 may determine the similarity between the first and second partial time-series data by any method, for example, probability calculation by using probability density distribution such as kernel density estimation. In such a case, the information processing device 100 need not have the parameter calculation unit 132. The ID extraction unit 133 may calculate characteristic values (e.g., mean, variance, frequency characteristics) from the feature parameters and extract similar IDs based on the similarity of the characteristic values.

For each signal combination, the similarity calculation unit 134 obtains a common part of the similar IDs and calculates a change in the number of similar IDs included in the common part over time. The number of similar IDs is also referred to as a similarity. Here, the signal combination includes not only the combination of two signal data pieces but also one signal data piece (single signal). The signal combination may include a combination of three or more signal data pieces. The signal combination includes a combination of all signal data pieces. Since the similar IDs are extracted for each partial time series, the similarity calculation unit 134 can calculate the change in the number of similar IDs over time.

The case where each time-series data piece includes three signal data pieces (e.g., signal 1, signal 2, and signal 3) will be described. In such a case, there are six types of signal combinations: combination 1, combination 2, combination 3, combination 1•2, combination 1•3, combination 2•3, and combination 1•2•3. The combination 1, combination 2, and combination 3 are single-signal combinations of the signal 1, the signal 2, and the signal 3, respectively. The combination 1•2 is a combination of the signals 1 and 2, the combination 1•3 is a combination of the signals 1 and 3, and the combination 2•3 is a combination of the signals 2 and 3. The combination 1•2•3, called all-signal combination or all combination, is a combination of the signal 1, signal 2, and signal 3.

Figure 2:
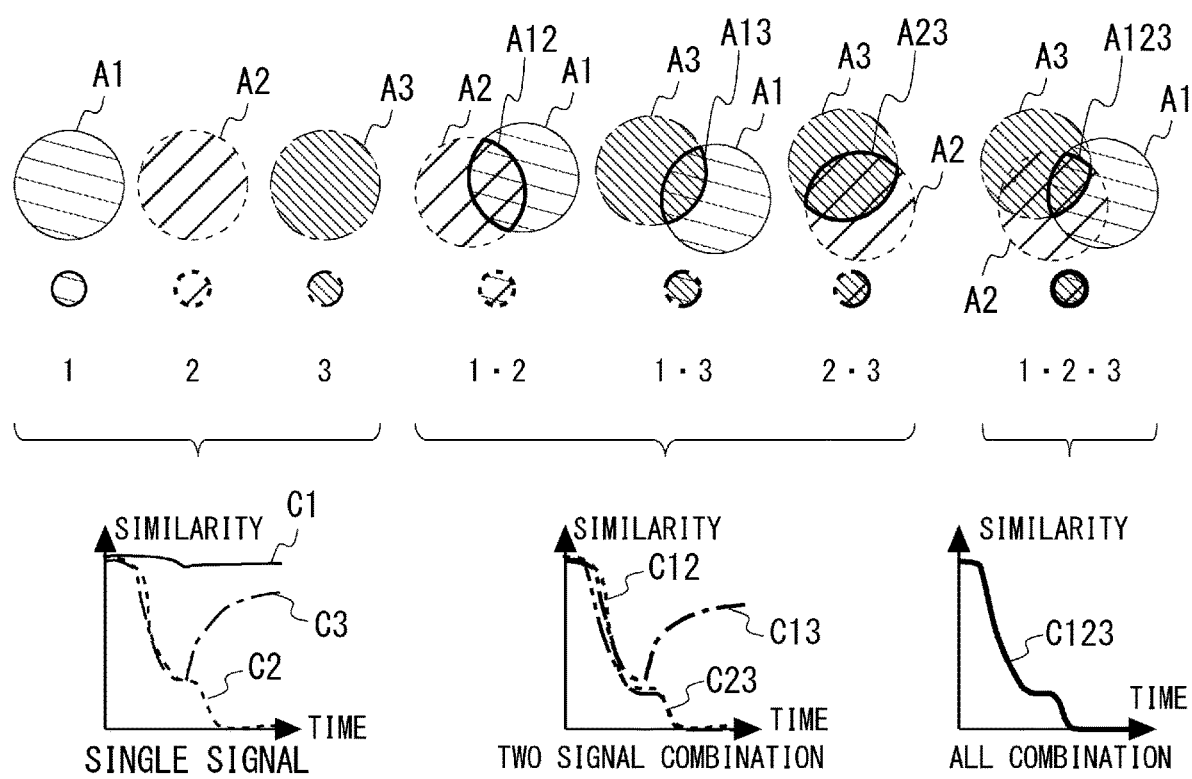
FIG. 2 is a diagram for explaining a similarity for each signal combination.

The change in the number of similar IDs over time calculated by the ID extraction unit 133 will be described with reference to FIG. 2. The upper side of FIG. 2 shows sets of similar IDs A1, A2, A3, A12, A13, A23, and A123 in the six signal combinations (combination 1, combination 2, combination 3, combination 1•2, combination 1•3, combination 2•3, and combination 1•2•3). Each of the sets A1, A2, and A3 represents a set of similar IDs in a single signal. The lower part of FIG. 2 shows the change in a similarity C1 of the signal 1 over time (combination 1), a change in a similarity C2 of the signal 2 (combination 2) over time, and a change in a similarity C3 of the signal 3 (combination 3) over time. The vertical axis of the graph indicates the similarity and the horizontal axis indicates time.

Hereinafter, the common parts in two or more signal combinations will be described. The term common part may also be applied to a single signal. For example, the set A1 may be referred to as a common part of one signal A1.

The set A12, the set A13, and the set A23 are sets of similar IDs in the two signal combinations. The set A12 of similar IDs in the combination 1•2 is the common part (intersection) of the sets A1 and A2. The set A13 of similar IDs in the combination 1•3 is the common part of the sets A1 and A3. The similar IDs in the combination 2•3 are the common part of the sets A2 and A3. The changes in the similarity C12 in the combination 1•2, the similarity C13 in the combination 1•3, and the similarity C23 in the combination 2•3 over time are shown in the lower part of FIG. 2. The vertical axis of the graph indicates the similarity and the horizontal axis indicates time.

The set A123 is a set of similar IDs in the three signal combinations. The set A123 of similar IDs in the combination 1•2•3 (all combination) is the common part of the sets A1, A2 and A3. The lower part of FIG. 2 shows the change in the similarity C123 in the combinations 1, 2 and 3 over time. The vertical axis of the graph indicates the similarity and the horizontal axis indicates time.

Returning to FIG. 1, the explanation is continued. The timing specifying unit 135 specifies the task timing related to an occurrence of an abnormal event based on the change in the similarity (the number of IDs included in the common part) in the all-signal combination over time. Specifically, the timing specifying unit 135 specifies the timing when the similarity in all combinations becomes less than or equal to the threshold.

The signal specifying unit 136 specifies at least either a single signal or a signal combination related to a cause of an abnormal event based on the change in the similarity over time (the change in the number of IDs included in the above common part over time). The single signal data may be associated with the cause of the abnormal event, and a combination of signal data may be associated with the cause of the abnormal event.

The signal specifying unit 136 specifies a single signal and a signal combination related to the cause of the abnormal event based on the aforementioned task timing. Specifically, if the number of similar IDs (similarity) in any of the signal data is less than or equal to a threshold in the task timing, the signal data is related to the cause of the abnormal event. Furthermore, if the number of similar IDs (similarity) in any signal combination is less than or equal to the threshold at the task timing, the signal combination is related to the cause of the abnormal event. Different values may be set for the thresholds for each combination.

Figure 3:
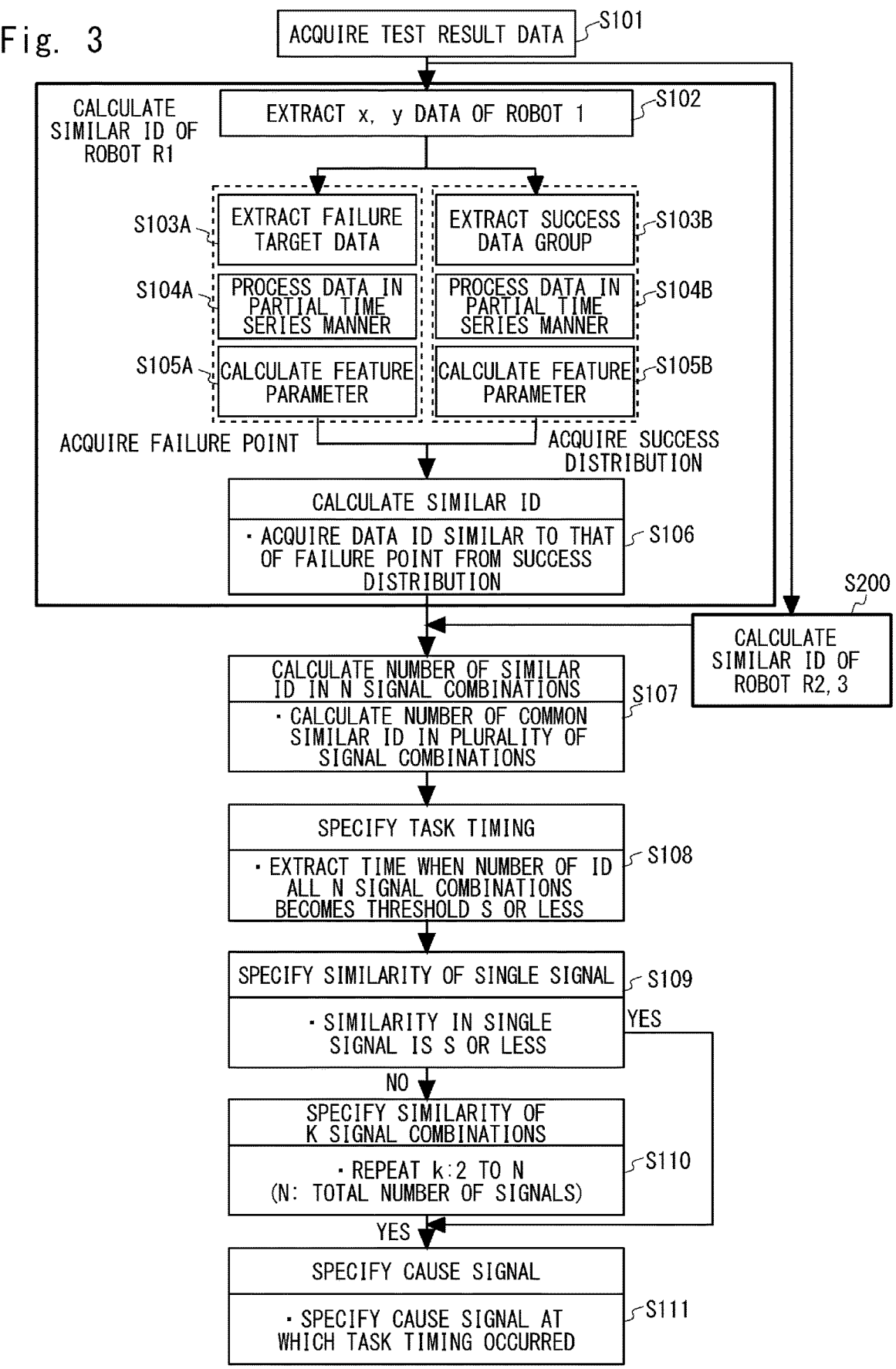
FIG. 3 is a flowchart showing a flow of information processing method according to the first embodiment.

Next, an information processing method according to the first embodiment will be explained with reference to FIG. 3. Specifically, a case where a search-based test examination is conducted by simulating passing of three robots will be described. First, the acquisition unit 110 of the information processing device 100 acquires a result of the search-based test examination by simulation (Step S101). Assume that the 500 pieces of simulation data includes 134 pieces of defect data (e.g., data in which a predetermined robot has not arrived at its destination point) and 366 pieces of success data.

Figure 4:
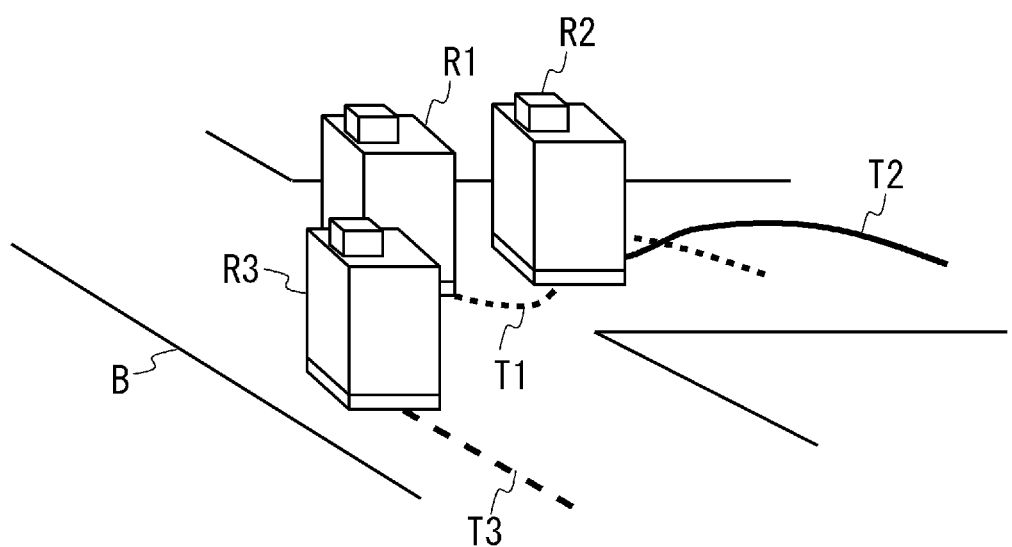
FIG. 4 is an overview diagram showing an overview of a passing simulation of robots.

FIG. 4 is an overview diagram showing an overview of the simulation. Robots R1, R2 and R3 pass each other in a T-shaped passage (corner) B. A sign T1 indicates a movement trajectory of the robot R1, a sign T2 indicates a movement trajectory of the robot R2, and a sign T3 indicates a movement trajectory of the robot R3.

Figure 5:
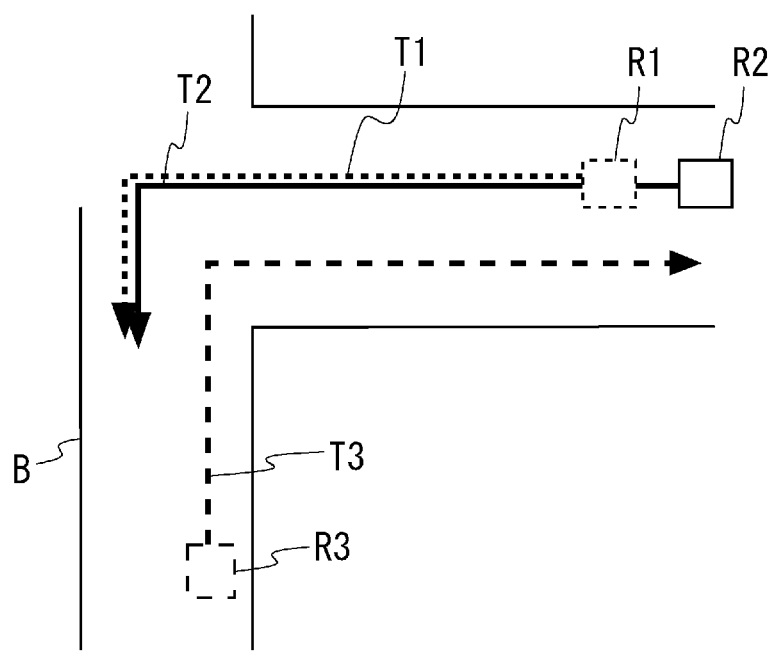
FIG. 5 is an overview diagram showing departure points and destination points of the robots.

The departure and destination points of the robots R1, R2, and R3 will be described with reference to FIG. 5. The positions of the robots R1, R2, and R3 indicate the departure points of the robots R1, R2, and R3, respectively. The sign T1 schematically indicates the movement trajectory of the robot R1, and a tip of the arrow indicates the destination point of the robot R1. The sign T2 schematically indicates the movement trajectory of the robot R2, and a tip of the arrow indicates the destination point of the robot R2. The sign T3 schematically indicates the movement trajectory of the robot R3, and a tip of the arrow indicates the destination point of the robot R3.

A simulation time is 120 seconds and the time is expressed as t=0 to 120 [s]. A departure time of the robot R1 is fixed at t=16 [s]. A departure time of the robot R2 is selected from a time between t=16 [s] and t=26 [s]. A departure time of the robot R3 is selected from a time between t=7 [s] and t=37 [s].

The system requirements are that the robot R1 or the robot R2 reaches its destination point within 120 seconds, and further, the robot R3 reaches its destination point within 120 seconds. The inventor has conducted a search-based test to search for scenarios that would violate the system requirements and performed 500 simulations.

The departure time of the robot R2 and the departure time of the robot R3 correspond to the simulation conditions. Assume that the horizontal axis is the departure time of the robot R2 and the vertical axis is the departure time of the robot R3, the points corresponding to the 500 simulation conditions can be plotted. In search-based tests, the distance between adjacent points is generally not constant. In grid tests, on the other hand, the distance between adjacent points is generally constant. A search-based test enables a search for defect data more efficiently than a grid test.

Figure 6:
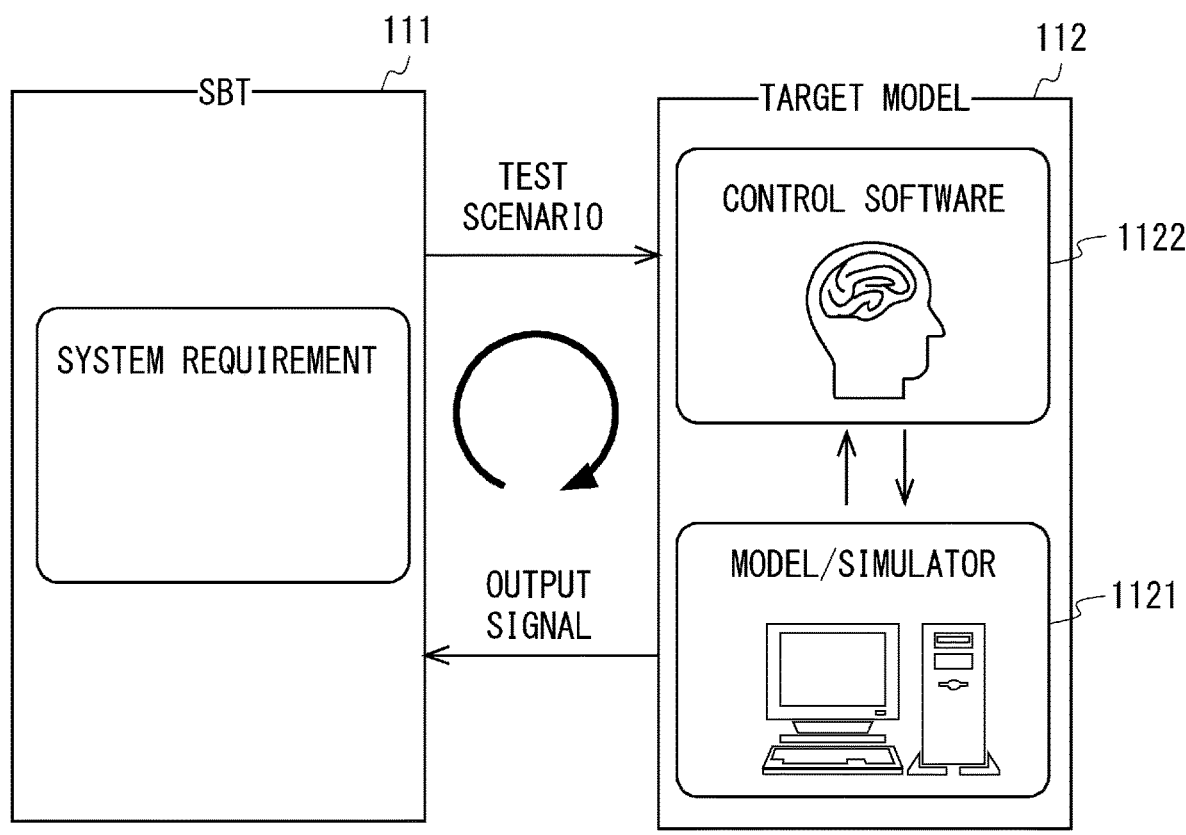
FIG. 6 is an overview diagram showing an overview of a search-based test.

FIG. 6 is an overview diagram showing an overview of the search-based test. A system shown in FIG. 6 includes a SBT (Search-based Testing) unit 111 and a target model 112. The acquisition unit 110 of the information processing device 100 may include the SBT unit 111 and the target model 112.

The SBT unit 111 conducts a search-based test by using the target model 112. The target model 112 includes a model/simulator 1121 and control software 1122 to control the model/simulator.

The aforementioned system requirements are set in the SBT unit 111, and a test scenario is input to the SBT unit 111. The test scenario includes the simulation conditions. The target model 112 receives the test scenario and returns an output signal indicating the simulation result. The output signal may include a signal indicating a change in the position coordinate of the robot R1 over time, a signal indicating a change in the position coordinate of the robot R2 over time, and a signal indicating a change in the position coordinate of the robot R3 over time.

Returning to FIG. 3, the explanation is continued. The acquisition unit 110 of the information processing device 100 extracts (x, y) data of each robot from the simulation result (Step S102). The processing of Steps S102 to S106 is performed on each of the signal data of the robot R1, the signal data of the robot R2, and the signal data of the robot R3. Hereinafter, a case in which the similar IDs of the robot R1 are calculated will be described.

Next, the data extraction unit 120 of the information processing device 100 extracts one piece of target abnormal time-series data (called failure target data) (Step S103A). Next, the data extraction unit 120 extracts a success data group (e.g., 366 pieces of the normal time-series data) (Step S103B).

Next, the partial time-series generation unit 131 of the information processing device 100 processes the failure target data in a partial time-series manner (Step S104A) and each normal time-series data included in the success data group in a partial time-series manner (Step S104B). The partial time-series generation unit 131 generates a plurality of partial time series by sliding a 10 second time window each second.

Next, the parameter calculation unit 132 of the information processing device 100 calculates a feature parameter from the partial time-series data of the failure target data (Step S105A) and calculates a feature parameter from the partial time-series data of each piece of the normal time-series data (Step S105B). The feature parameter is used to specify a cause signal, which will be described later. Specifically, the feature parameter is obtained by extracting (x, y) information from each partial time-series data and arranging the extracted (x, y) information. For example, if 11 pieces of (x, y) data of the robot R1 are extracted, the feature parameters become 22 dimensional data.

Figure 7:
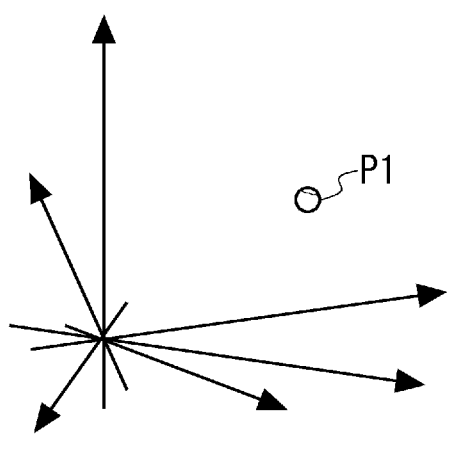
FIG. 7 is a diagram for explaining a failure target point.
Figure 8:
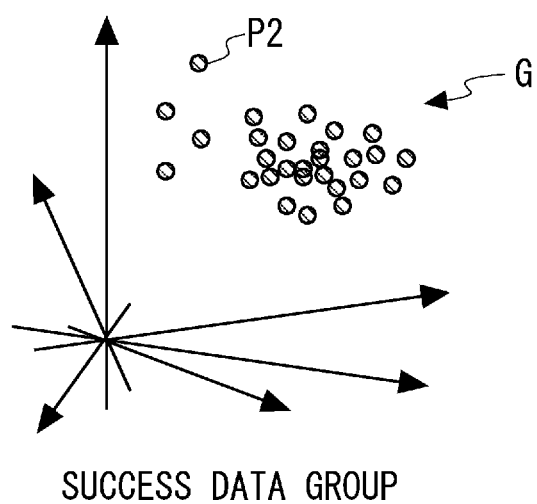
FIG. 8 is a diagram for explaining a success data group.

The parameter calculation unit 132 extracts the feature parameter from each piece of the partial time-series data, and a distribution of one failure target point and 366 success points (also called a success data distribution) is determined. FIG. 7 is an overview diagram showing an overview of a failure target point P1. The failure target point P1 is plotted in a 22 dimensional space. FIG. 8 is an overview diagram showing an overview of a success data distribution G. A plurality of success points P2 are plotted in a 22 dimensional space.

Returning to FIG. 3, the explanation is continued. Next, the ID extraction unit 133 of the information processing device 100 extracts, from the success distribution, a success point whose Euclidean distance to the failure target point is less than or equal to a tolerance error threshold (e.g., 0.2), and acquires the ID of the corresponding normal time-series data (Step S106). The IDs of normal time-series data similar to that of the failure target data have been acquired.

Figure 9:
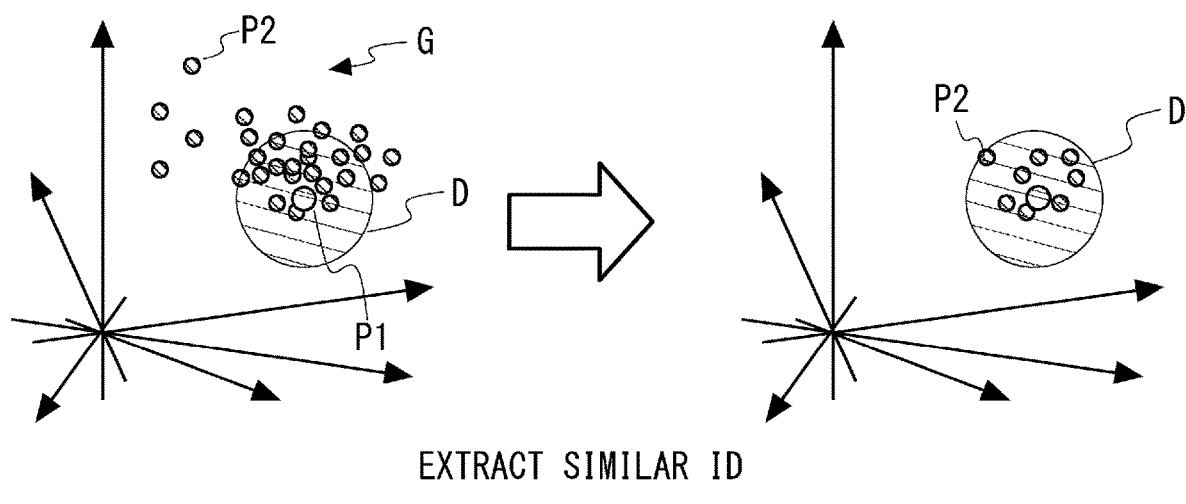
FIG. 9 is a diagram for explaining a method for extracting similar IDs.

The method for extracting similar IDs will be described in detail with reference to FIG. 9. The left side of the blank arrow shows the success data group G, and the right side of the blank arrow shows the extracted success points. An area D shows an area where the distance to the failure target point P1 is less than the tolerance error threshold. The ID extraction unit 133 extracts a success point P2 included in the area D and acquires the corresponding ID.

Returning to FIG. 3, the explanation is continued. As described above, the processing of Steps S102 to S106 is also performed on the position data of the robots R2 and R3 (Step S200).

Next, the similarity calculation unit 134 of the information processing device 100 obtains the common part of the similar ID for each signal combination and a change in the number (similarity) of similar IDs included in the common part (Step S107). The similar IDs are also referred to as common similar IDs. The similarity calculation unit 134 obtains similarity IDs for six kinds of signal combinations that are combinations of the position data of robot R1 (signal 1), the position data of the robot R2 (signal 2), and the position data of the robot R3 (signal 3). The similarity calculation unit 134 calculates the number of similar IDs at each time (in each time section) and in each combination by obtaining the similar IDs of all pieces of the partial time-series data.

Next, the timing specifying unit 135 of the information processing device 100 specifies the timing (time) when the similarity (the number of IDs) in an all-signal combination becomes less than or equal to a threshold S (e.g., one) as the task timing (Step S108). The all-signal combination is a combination of the position data of the robot R1, the position data of the robot R2, and the position data of the robot R3.

Figure 10:
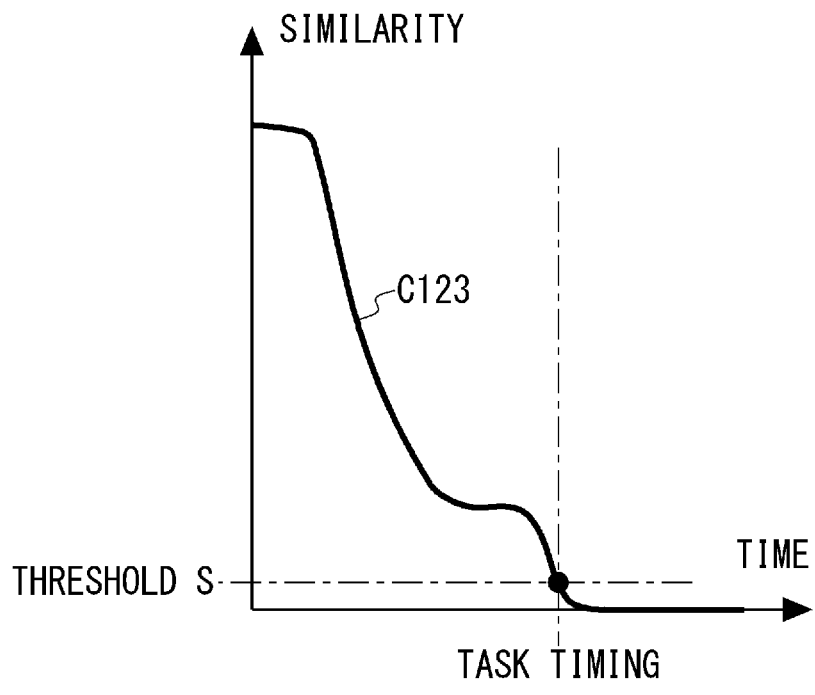
FIG. 10 is a diagram for explaining a task timing.

The method for detecting the task timing will be described in detail with reference to FIG. 10. FIG. 10 is a graph showing the similarity C123 for all-signal combination 1•2•3. The vertical axis indicates the similarity, and the horizontal axis indicates the time. The timing specifying unit 135 detects a timing (e.g., 80.0 seconds) when the similarity C123 becomes less than or equal to the threshold S. It is considered that an unexpected behavior has occurred at this timing.

Returning to FIG. 3, the explanation is continued. Next, the signal specifying unit 136 of the information processing device 100 specifies a cause signal. The signal specifying unit 136 first determines whether the number of similar IDs (similarity) of a single signal at the task timing is less than or equal to the threshold value S (e.g., one) (Step S109). The single signal is the position data of the robot R1, the position data of the robot R2, and the position data of the robot R3.

If the number of similar IDs of the single signal is less than or equal to the threshold (Yes in Step S109), the signal specifying unit 136 specifies the single signal as the cause signal (Step S111). If the number of similar IDs of the single signal is greater than the threshold (No in Step S109), the signal specifying unit 136 transitions to the processing in Step S110.

In Step S110, the signal specifying unit 136 determines whether the number of similar IDs (similarity) of each signal combination is less than or equal to the threshold S. When the total number of signals is N, the signal specifying unit 136 changes the number k of combinations from two to N and repeatedly performs determination processing. If the determination result is true (Yes in Step S110), the signal specifying unit 136 specifies the signal combination as the cause. When k=N, the all-signal combination may be specified as the cause.

Specifically, the signal specifying unit 136 first checks the number of similar IDs (similarity) of the single signals (signal 1, signal 2, and signal 3) at the task timing. When there is a single signal whose number of similar IDs is less than or equal to the threshold S, the signal specifying unit 136 specifies the single signal as the signal that caused the task timing.

When no single signal whose similarity is less than or equal to the threshold is found, the signal specifying unit 136 checks the similarity of the combination of the two signals (combination 1•2, combination 1•3, and combination 2•3) at the task timing. When there is a signal combination whose similarity is less than or equal to the threshold, the signal specifying unit 136 specifies the signal combination as the signal that caused the task timing.

When no signal combination whose similarity is less than or equal to a threshold is found, the signal specifying unit 136 specifies the all-signal combination (the combination 1•2•3) as the signal combination that caused the task timing.

Figure 11A:
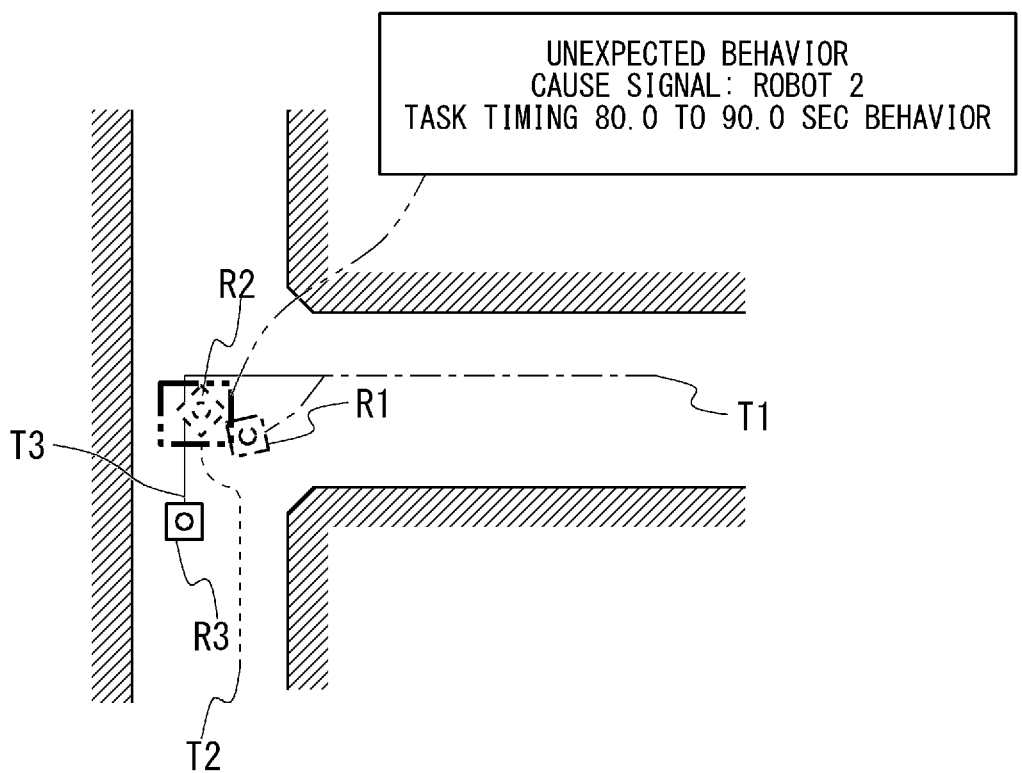
FIG. 11(A) is a diagram for explaining a result of specifying a cause signal.
Figure 11B:
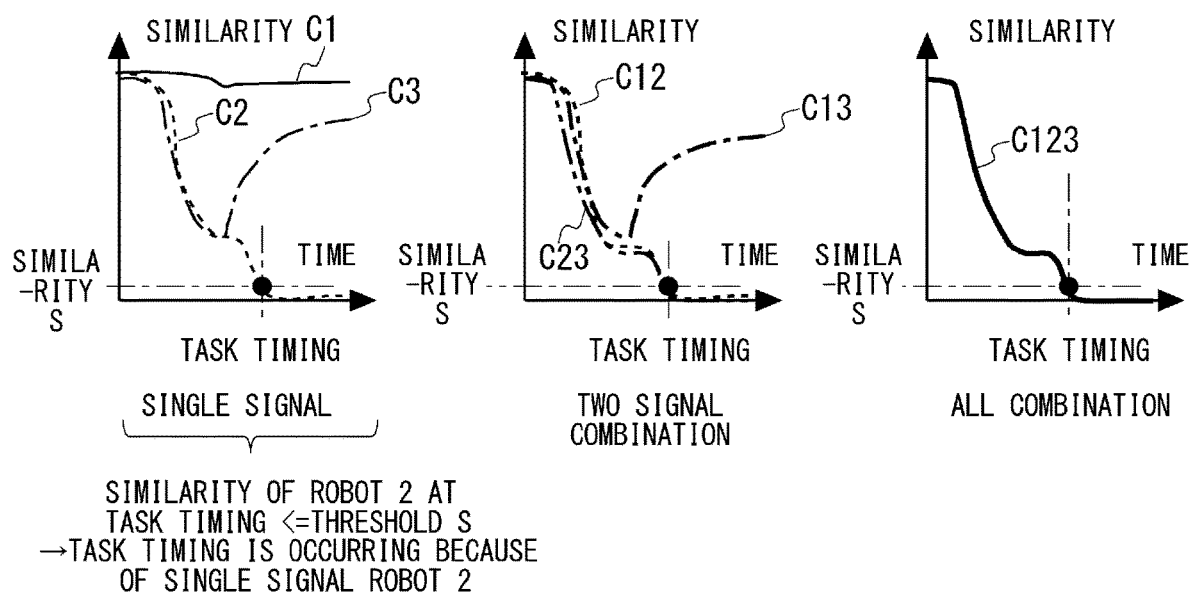
FIG. 11(B) is a diagram for explaining a result of specifying a cause signal.

FIG. 11(A) and FIG. 11(B) are overview diagrams showing the method for specifying the cause signal. FIG. 11(A) shows a simulation result of the movement of the robots R1, R2, and R3. The task timing shall be a time section of 80.0 to 90.0 sec. The thick frame indicates the position where an unexpected behavior has occurred, which is determined by determining the cause signal.

FIG. 11(B) shows the similarities C1, C2, C3, C12, C13, C23, and C123 in the signal combinations 1, 2, 3, 1•2, 1•3, and 1•2•3. The vertical axis indicates the similarity, and the horizontal axis indicates the time.

The signal specifying unit 136 determines whether C1, C2, C3, C12, C13, and C23 are less than or equal to the threshold S at the task timing. In FIG. 11(B), C2 is less than or equal to the threshold S at the task timing. In such a case, the signal specifying unit 136 specifies the signal 2 as the cause signal. In such a case, it is determined that the task timing is caused by the robot R2.

Lastly, the effects of the information processing device according to the first embodiment will be described. Simulations and experimental tests are sometimes conducted with the aim of examining that control systems are created as required by developers. If a test result includes defect data, the developer is required to check the behavior of the system, determine the need for a fix, determine a cause of the defect, and fix the system.

In particular, specifying a cause of a defect in multidimensional time-series data including information about a plurality of signals requires an analysis on phenomena of the plurality of signals that occur in a chain, which requires domain knowledge of the control system and a lot of man-hours. Generally, in specifying a cause of a defect, a signal of a behavior different from a "behavior expected by the developer to satisfy the system requirements" is specified, and then a cause is specified by analyzing the specified behavior. However, specifying an unexpected behavior requires a manual analysis by someone with detailed domain knowledge.

Therefore, a technique that supports extraction of an unexpected behavior without requiring detailed domain knowledge is proposed in the present disclosure. In detecting an unexpected behavior, it is difficult for a machine to know the developer's assumption, or "implicit partial behavior requirement for each signal". Therefore, this proposal makes the assumption that "success data in which no defect is occurring satisfies the system requirements by satisfying implicit partial behavior requirements" and specifies an unexpected behavior of failure target data by using the success data acquired in the test. Specifically, a system that supports specification of a cause of a defect by specifying a timing (task timing) when a behavior not found in the success data occurs and a signal that is thought to be the cause of the behavior is proposed.

According to the information processing device of the first embodiment, it is possible to automatically specify a task timing and a cause signal of an unexpected behavior. Therefore, detailed domain knowledge of the developer is not required, and the man-hours for specifying a cause of a defect can be reduced.

If only the feature parameter necessary for detection of task timing and a cause signal, that is, the signal information of interest, can be set, then only a small number of hyper-parameters (partial time-series data length and similarity threshold) need be set. Therefore, the information processing method according to the first embodiment does not require expert knowledge of the target control system.

When the similarity of a plurality of signals is calculated, commonly a similarity threshold T in the feature parameters of each combination is set (e.g., $T_A$, $T_B$, $T_C$, $T_{A \cdot B}$, $T_{A \cdot C}$, $T_{B \cdot C}$, $T_{A \cdot B \cdot C}$ in case of a combination of three signals). In contrast, the similarity between a plurality of signals is obtained by setting the similarity threshold T (e.g., $T_A$, $T_B$, and $T_C$) for each signal and extracting the common ID.

The information processing system does not necessarily have a configuration in which all of the functional elements are integrated in the information processing device 100. For example, the function of the examination unit 130 may be carried by an operation unit provided in a server connected to the information processing device 100 via a network. In this case, the server sends an examination result to the information processing device 100. In this manner, the information processing system may be configured to include the server and the information processing device 100. The processor or memory described above may be disposed on a server or in both the information processing device 100 and the server.

In the above example, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above embodiments and can be modified as appropriate without departing from the purport.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An information processing system comprising:
a processor configured to:
acquire a plurality of time-series data pieces, each time-series data piece including a plurality of signal data pieces, and the plurality of time-series data pieces including abnormal time-series data and a plurality of normal time-series data pieces;
determine for each signal data piece whether the abnormal time-series data is similar to each normal time-series data piece in each time section and examine an abnormal event based on a result of the determination;
simulate a movement of a plurality of objects whose relative positions change with respect to each other according to time, wherein simulation conditions are preset and include a departure point and time of each of the plurality of objects;
generate partial time-series data by sliding a predetermined time window each second and determine a feature point of each data piece in the partial time-series data including extracting position coordinates of at least one object of the plurality of objects at each of a plurality of time points; and
conduct a search-based test to identify one or more scenarios, including defect data, that violate one or more requirements, wherein
simulation data, from the simulated movement, includes the abnormal time-series data when it violates the one or more requirements, a first requirement including that the at least one object reaches its destination point within a predetermined time, and a second requirement including that an error of position estimation for each of the plurality of objects is less than or equal to a threshold, and
each of the plurality of objects are autonomous objects.

2. The information processing system according to claim 1, wherein
the processor is configured to calculate, for each signal data piece, a feature point of each time-series data piece in each time section and determine whether the feature point of each normal time-series data piece is included in a predetermined range of the feature point of the abnormal time-series data.

3. The information processing system according to claim 1, wherein
the plurality of time-series data pieces are position data of the plurality of objects whose relative positions change with respect to each other according to a time, and
the abnormal event is caused by an interaction of the plurality of objects.

4. The information processing system according to claim 1, wherein the processor is configured to:
the extract, for each signal data piece, an ID of the normal time-series data similar to that of the abnormal time-series data in each time section,
the obtain a common part of the IDs for each signal combination,
the calculate, for each signal combination, a change in the number of IDs included in the common part over time, and
the specify at least one of a single signal and a signal combination associated with a cause of the abnormal event based on a result of the calculation.

5. The information processing system according to claim 4, wherein the processor is configured to:
the specify a timing associated with an occurrence of an abnormality based on the change in the number of IDs included in the common part of an all-signal combination over time, and
the specify at least one of a single signal and a signal combination related to a cause of the abnormal event further based on the timing.

6. An information processing method performed by a computer, the information processing method comprising:
acquiring a plurality of time-series data pieces, each time-series data piece including a plurality of signal data pieces, and the plurality of time-series data pieces including abnormal time-series data and a plurality of normal time-series data pieces;
determining for each signal data piece whether the abnormal time-series data is similar to each normal time-series data piece in each time section and examining an abnormal event based on a result of the determination;
simulating a movement of a plurality of objects whose relative positions change with respect to each other according to time, wherein simulation conditions are preset and include a departure point and time of each of the plurality of objects;
generating partial time-series data by sliding a predetermined time window each second and determining a feature point of each data piece in the partial time-series data including extracting position coordinates of at least one object of the plurality of objects at each of a plurality of time points; and
conducting a search-based test to identify one or more scenarios, including defect data, that violate one or more requirements, wherein
simulation data, from the simulated movement, includes the abnormal time-series data when it violates the one or more requirements, a first requirement including that the at least one object reaches its destination point within a predetermined time, and a second requirement including that an error of position estimation for each of the plurality of objects is less than or equal to a threshold, and
each of the plurality of objects are autonomous objects.

7. A non-transitory computer readable medium storing a program for causing a computer to execute:
acquiring a plurality of time-series data pieces, each time-series data piece including a plurality of signal data pieces, and the plurality of time-series data pieces including abnormal time-series data and a plurality of normal time-series data pieces;
determining for each signal data piece whether the abnormal time-series data is similar to each normal time-series data piece in each time section and examining an abnormal event based on a result of the determination;
simulating a movement of a plurality of objects whose relative positions change with respect to each other according to time, wherein simulation conditions are preset and include a departure point and time of each of the plurality of objects;
generating partial time-series data by sliding a predetermined time window each second and determining a feature point of each data piece in the partial time-series data including extracting position coordinates of at least one object of the plurality of objects at each of a plurality of time points; and
conducting a search-based test to identify one or more scenarios, including defect data, that violate one or more requirements, wherein
simulation data, from the simulated movement, includes the abnormal time-series data when it violates the one or more requirements, a first requirement including that the at least one object reaches its destination point within a predetermined time, and a second requirement including that an error of position estimation for each of the plurality of objects is less than or equal to a threshold, and
each of the plurality of objects are autonomous objects.

\* \* \* \* \*